(12) United States Patent  
Leung

(10) Patent No.: US 6,633,931 B2
(45) Date of Patent: Oct. 14, 2003

(54) CARD IDENTIFICATION SYSTEM AND METHOD FOR AN INPUT/OUTPUT INTERFACE

(75) Inventor: Samuel C. Leung, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 09/751,991

(22) Filed: Dec. 29, 2000

(65) Prior Publication Data

US 2002/0087762 A1 Jul. 4, 2002

(51) Int. Cl.[7] .......................... G06F 13/10; G06F 13/14
(52) U.S. Cl. ...................... 710/62; 710/8; 710/11; 710/14; 710/64; 370/442
(58) Field of Search .............................. 710/8, 11, 14, 710/62, 64; 370/442

(56) References Cited

U.S. PATENT DOCUMENTS

| 5,454,725 A | * | 10/1995 | Speiser et al. ............... 439/61 |
| 5,615,344 A | * | 3/1997 | Corder ......................... 710/62 |
| 5,712,472 A | * | 1/1998 | Lee ............................. 235/486 |
| 5,819,050 A | * | 10/1998 | Boehling et al. ............ 710/104 |
| 6,009,486 A | * | 12/1999 | Dayan et al. ................ 710/303 |
| 6,059,583 A | * | 5/2000 | Croft et al. ................. 439/131 |
| 6,182,204 B1 | * | 1/2001 | Nakashima .................. 712/38 |
| 6,452,937 B1 | * | 9/2002 | Borkovic et al. ............ 370/442 |

* cited by examiner

*Primary Examiner*—Rehana Perveen

(57) ABSTRACT

A system and method for detecting the identification of the type of card that is installed in an input/output interface for interconnecting first and second electronic devices, such as a peripheral device and a peripheral control device is disclosed. The cards may be smart or peripheral dependent cards which have different functionality and configuration. Upon start-up, the peripheral device generates a reset signal which causes the card to generate a digital identification that is received by the peripheral device. If the identification indicates that it is a type of card that the peripheral device supports, then the peripheral device operates in the manner specified for that type of card.

17 Claims, 2 Drawing Sheets

CARD IDENTIFICATION SYSTEM AND METHOD FOR AN INPUT/OUTPUT INTERFACE

BACKGROUND OF THE INVENTION

The present invention is directed to a system for detecting the identification of a card that is installed in an input/output interface, and more particularly to a system for identifying the type of card that may be installed in an input/output interface between two electronic components, such as a peripheral device and a peripheral control device, for example.

As the functional capabilities of electronic products continue to expand, new products continue to be developed which must be compatible across manufacturers' product lines. This is particularly evident in the areas of personal computers that are used in the home and in large and small business environments, which may or may not be connected in a network or the Internet. Such personal computers are usually operationally connected to peripheral devices such as printers of various kinds, plotters, scanners, fax machines, copiers and the like, including multi-function peripherals which can perform the more than one task of those mentioned above.

One of the relatively recent advancements in the design of peripheral devices is the expansion of their operational capabilities through the use of cartridges or cards that can be plugged into a shared input/output interface of the peripheral device that is intended to operate in conjunction with a control device. Such cards can be so-called peripheral dependent cards which can implement basic functionality, or they can be smart cards which typically includes operational protocol that can increase the functional capability of the peripheral in conjunction with a control device, such as a print server, for example.

Because different types of cards may be plugged into the interface, it is necessary to know the identity of the type of card that is plugged into the interface of a peripheral device so that the functionality and configuration are supported in the system. Since the peripheral device is the device that is generally considered to be the master device in a system that wishes to perform the peripheral device function, i.e., a printer, for example, must have the necessary input control commands to operate properly. It is the peripheral device that must support the cards that may be plugged into the peripheral interface.

If the peripheral device does not support a particular card, then damage to the card and/or the peripheral device can easily occur if output signals are not applied to output lines, and input signals are not applied to input lines. It is therefore extremely important that the system be appropriately configured so that damage resulting from device interconnection incompatibility does not occur.

SUMMARY OF THE INVENTION

The present invention embodies a system and a method for detecting the identification of the type of card or cartridge that may be plugged into an electrical interface that interconnects two electronic devices, such as a peripheral device and a peripheral control device. Because the cards may have different functionality and utilize different configurations, it is important that the peripheral device support the functionality of the card that is plugged into the interface. Upon start-up, the peripheral device generates a signal which causes the card to generate a digital identification that is received by the peripheral device. If the identification indicates that it is a type of card that the peripheral device supports, then the peripheral device operates in the manner specified for that type of card. The preferred embodiment of the card is an implementation that requires only a single pin to reset a chip and generate the digital identification, and therefore requires only minimal overhead in the design and operation of the input/output interface.

DETAILED DESCRIPTION

Broadly stated, the present invention is directed to a system for detecting or determining the identification of the type of card that is installed in an input/output interface electrically interconnecting two electronic devices, such as a peripheral device and a peripheral control device. The identification enables the devices to determine if they are compatible with one another and prevents generation of signals by each to the other that may be incorrect and could therefore cause damage to one or both. The reason that incorrect signals could be generated is that cards are being developed that have different functionality and configurations.

In this regard, an interface may have a relatively large number of electrical conductors or lines, for example, several dozen in some instances, and some of the lines have dedicated functions while others are general input/output lines. Some of the cards may be so-called peripheral dependent cards that have basic functionality, while other cards may be smart cards that have a specific protocol that overlays the interface. The use of a digital identification enables the card's functionality to be specifically defined, which among other things, specifies which of the general input/output lines are input lines and which are output lines.

However, the configuration of a card must be predetermined as to whether it is within the manufacturer's product line or is supplied by third party manufacturers. If a particular card is compatible with the peripheral and can be configured for use with a peripheral device, then its configuration can be specified and a digital identification can be defined and a library of such identifications and associated configurations can be loaded into a suitable memory in the peripheral device (typically burned in ROM or a flash memory or the like). When the peripheral device receives a digital identification, it can compare the same with digital identifications within the library and configure itself in accordance with its specifications. If there is no positive comparison, the particular card is not supported by the peripheral device and it will generate a flag or other error message and not permit itself to generate or receive signals from the card. This will prevent incorrect signals from crossing the interface which could damage either the card or the peripheral device.

Figure 1:
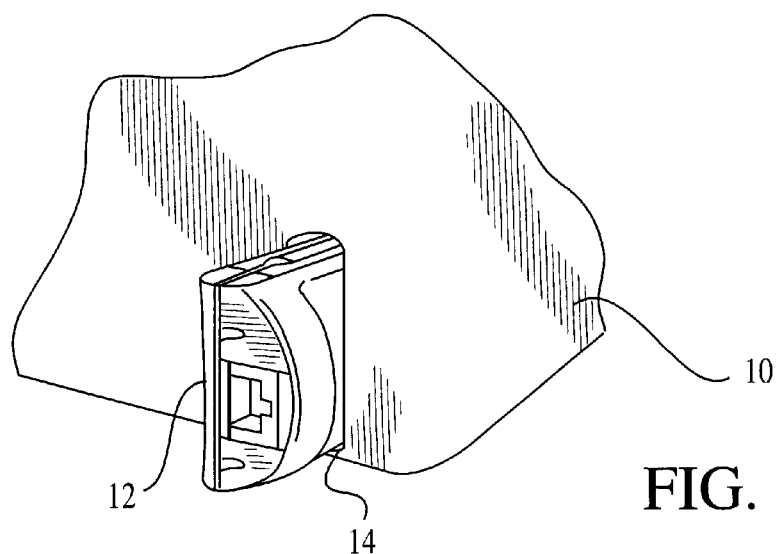
FIG. 1 is a perspective view of a front portion of a printer peripheral device of the type which has a slot in which a card (i.e., a cartridge) is inserted, with the card controlling at least some of the functionality of the device.
Figure 2:
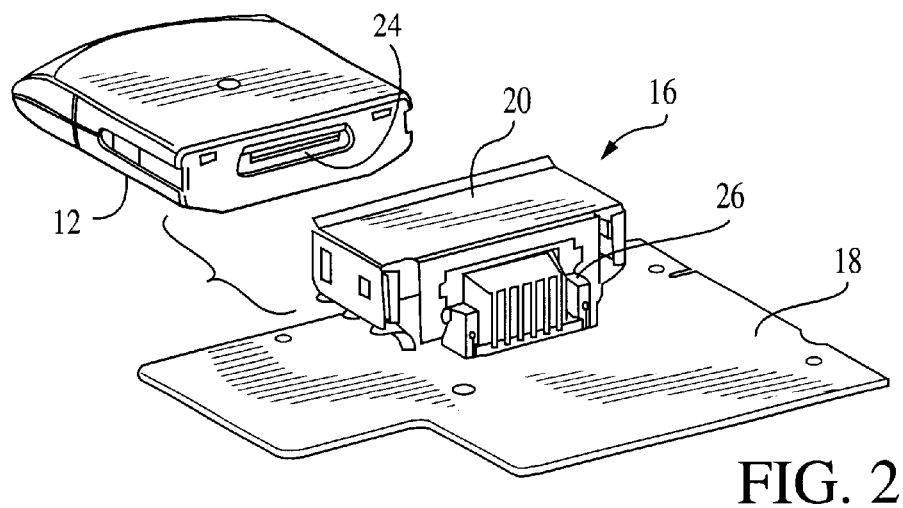
FIG. 2 is a perspective view of a printed circuit board having an interface attached thereto, including a metallic "garage" in which a card can be inserted, and shown together with a generally back view of a card.
Figure 3:
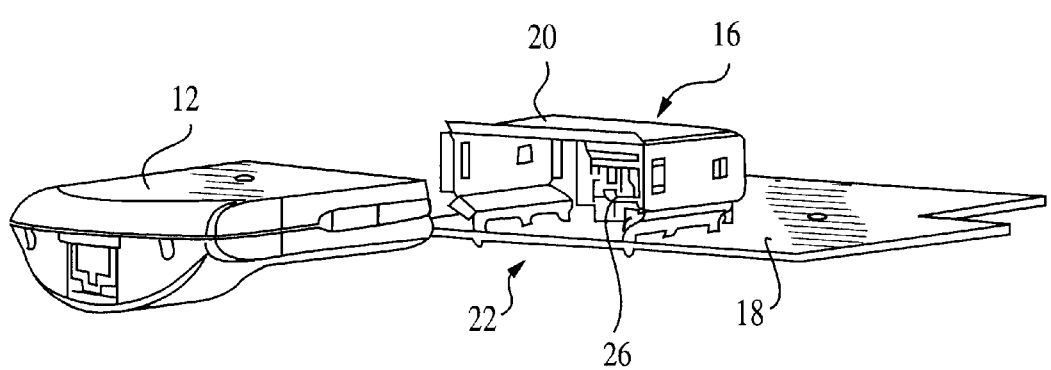
FIG. 3 is another perspective view (similar to FIG. 2) of the printed circuit board having the interface attached thereto, including a front view of the metallic garage, shown together with a generally front view of the card.

Turning now to the drawings and particularly FIG. 1, a printer 10 is shown with a card 12 plugged into a slot 14. As should be evident from the previous discussion, the card 12 may be a peripheral dependent or smart card and may be manufactured by the printer manufacturer or a third party. Referring to FIGS. 2 and 3, the card 12 fits within an interface, indicated generally at 16, that is attached to a printed circuit board 18 that is installed within the printer 10 or other peripheral device, such as a scanner, plotter, fax machine, copier, multi-function device or the like. The interface 16 shown has a metal enclosure or garage 20 which has an opening 22 at the front through which the card can be inserted. The opening is coextensive with the slot 14 in the printer 10. The card 12 has a multi-pinned connector 24 that is aligned to engage another multi-pinned connector 26 in the interface when the card is inserted into the interface 16. The connector 26 has a right angle connection to the printed circuit board 18 Although not shown in detail, the connectors illustrated have 40 pins (and therefore 40 electrical conductors or lines) that interconnect the card 12 with the printer 10.

Figure 4:
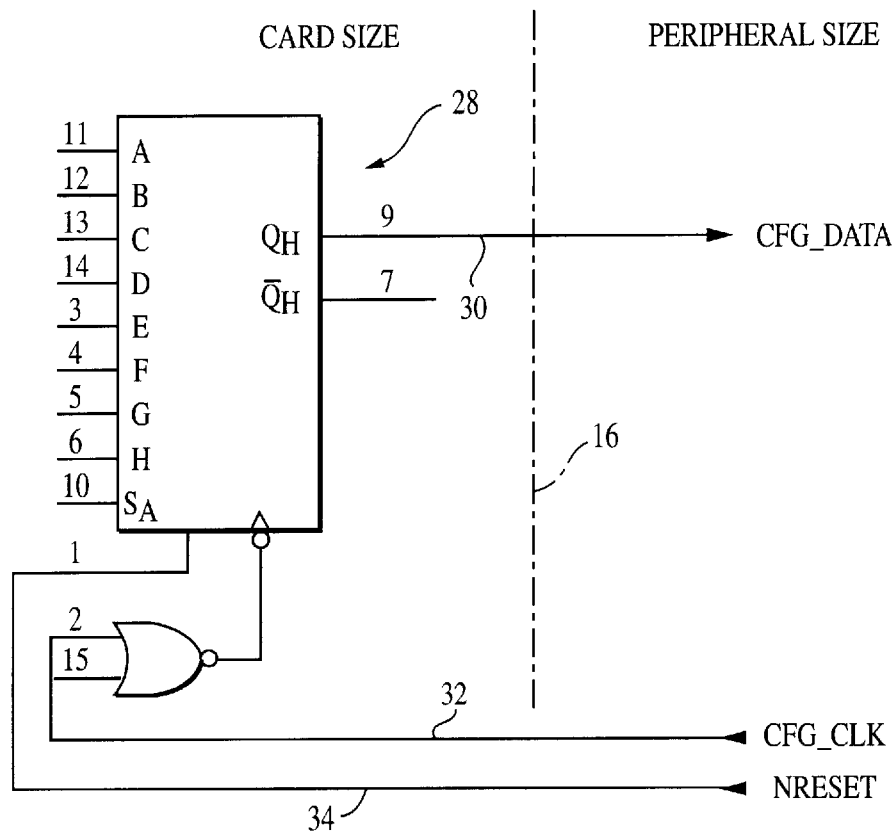
FIG. 4 is a schematic circuit diagram of a preferred embodiment of the present invention.

To generate the digital identification, the card 12 preferably has an 8-bit parallel input, serial output shift register, indicated generally at 28 in FIG. 4, preferably a high performance silicon-gate CMOS integrated circuit, such as Model MC74HC165A sold by Motorola. It should be understood however, that other devices could be used, including devices made by vendors other than Motorola, and which could have a greater or lesser number of bits. By utilizing 8 bits, 256 different card identifications could be accommodated. It should be understood that a larger or smaller number of bits may be utilized if a larger or smaller number of different card identifications are desired. The shift register 28 is part of the card 12 and has a serial input $S_A$ and 8 parallel inputs A–H, with input H being the least significant bit. A serial output line 30 extends to the peripheral side and carries the 8-bit serial digital identification signal CFG_DATA to the peripheral, when it is outputted. A clock signal from the peripheral is applied on line 32 and a reset signal (NRESET) is applied on line 34 to the card 28 by the peripheral.

The unique digital identification is produced by applying the appropriate logic levels to the inputs A–H. For example, if the digital ID is 2, that would be generated by having inputs A–G and H at logic 0 and input G at logic 1. Similarly, card ID 0 would be generated when all inputs A–H are at logic 0, and ID 255 would be generated when all inputs are at logic 1. These logic values are constantly applied to the parallel inputs for each type of card as previously described.

Figure 5:
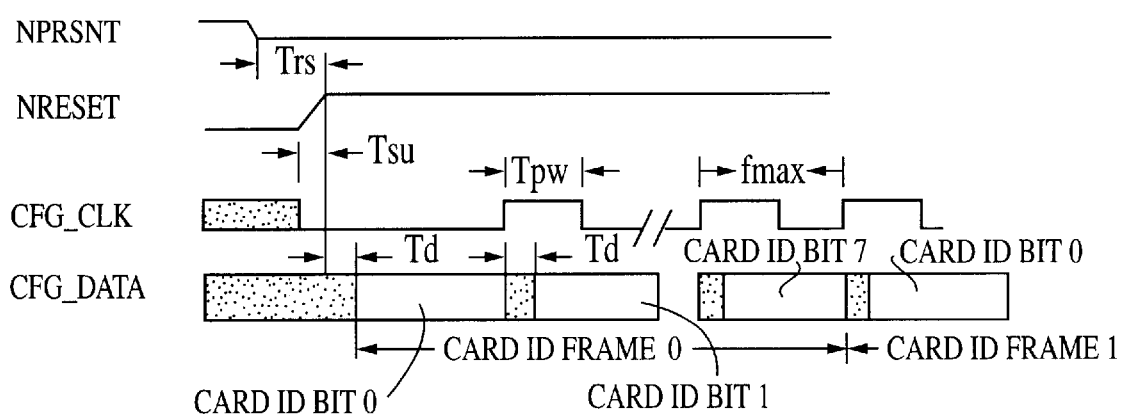
FIG. 5 is a timing diagram of the operation of preferred embodiment shown in FIG. 4.

In accordance with an important aspect of the present invention, and referring to the timing diagram of FIG. 5, the generation of the digital identification is commenced as soon as the reset signal is applied on line 34. Importantly, the digital identification is only requested when the peripheral device is powered-up or when a card is inserted into the interface 16. Once the peripheral detects the insertion of a card, it holds NRESET low for an additional 100 millisecond Minimum. The additional time for the assertion of NRESET allows the card enough time to reset properly and to load the 8-bit card identification value into the shift register. The clock signal CFG_CLK must be low prior to the deassertion of NRESET. After the deassertion of NRESET, the identification bit 0 (input H) is outputted on CFG_DATA after Td time. On each rising edge of CFG_CLK, the next least significant bit is outputted on CFG_DATA line 30. After seven successive clock cycles applied on line 32 by the peripheral, the complete 8-bit digital identification is clocked out on line 30.

An important aspect of the present invention is that the application of the reset signal causes the first bit to be loaded into the shift register. This is in contrast to the usual convention of a reset signal resetting an integrated circuit and a separate signal on another line to load the inputs into the shift register. The importance of simultaneously beginning to load the shift register upon application of the resent signal is to utilize a single line rather than two. This significantly reduces the overhead required to generate the digital ID. Since the clock signal is required for operation of the card, a total of three lines are required for requesting and receiving the digital identification signal.

From the foregoing, it should be appreciated that a system for detecting a digital identification of a card used in an input/output interface has been described which has many desirable advantages and attributes. The invention utilizes inexpensive components in a unique manner to request and communicate the digital identification from a card to a peripheral device with little overhead in terms of utilizing valuable electrical lines and connector pins, and is very reliable.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for detecting the identification of the type of card means installed in an input/output interface that electrically interconnects first and second electronic devices, the type of card means defining its predetermined functionality and configuration, said system comprising:

an interface for electrically interconnecting the first and second electronic devices;

a card means for generating a digital identification that identifies the type of card means and therefore its predetermined functionality and configuration and applying said digital identification to the first electronic device in response to a first signal being applied thereto;

the first electronic device initially generating a first signal that is received by said card means;

the first electronic device comparing said digital identification to a library of one or more digital identifications and configuring itself to operate in accordance with the predetermined functionality and configuration in response to a positive comparison to said applied digital identification;

the first and second electronic devices selectively sending and receiving signals in accordance with the type of card means identified.

2. A system as defined in claim 1 wherein said first signal is a reset signal that is generated when the first electronic device is initially powered up.

3. A system as defined in claim 1 wherein the first electronic device is a peripheral device and the second electronic device is a peripheral control device.

4. A system as defined in claim 3 wherein the first electronic device is a peripheral device that performs at least one of the functions of a scanner, a plotter, a printer, a fax machine and a copier.

5. A system as defined in claim 3 wherein the second electronic device is a peripheral control device that comprises one of a personal computer, a print server, a microprocessor, an ASIC and a processing means.

6. A system as defined in claim 1 wherein said interface includes a plurality of separate electrical conductors, the functionality and configuration that is specified by the type of said card means including the designation of selected ones of said plurality of conductors as input or output conductors to the first electronic device.

7. A system as defined in claim 1 wherein said card means comprises a shift register of the type which has a plurality of parallel inputs, a reset input, a clock input and a serial output, said shift register generating said digital identification signal in response to said first signal being received and clock signals being applied.

8. A system as defined in claim 7 wherein said shift register has 8 parallel inputs, and said serial output is capable of generating 256 different digital identification signals.

9. A system as defined in claim 1 wherein said first electronic device generates said first signal when said first electronic device is powered up.

10. A system for detecting the identification of the type of card means installed in an input/output interface that electrically interconnects a peripheral device and a peripheral control device, the card means identification specifying of the type of card means, the type of card means defining predetermined functionality and configuration, said system comprising:

an interface for electrically interconnecting the peripheral device and the peripheral control device;

a card means for generating a digital identification that identifies the type of card means and therefore its predetermined functionality and configuration and applying said digital identification to the peripheral device in response to a reset signal being applied thereto;

the peripheral device initially generating a reset signal that is received by said card means;

the peripheral device comparing said digital identification to a library of one or more digital identifications and configuring itself to operate in accordance with the predetermined functionality and configuration in response to a positive comparison to said applied digital identification;

the peripheral device and peripheral control device selectively sending and receiving signals in accordance with the type of card means identified.

11. A system as defined in claim 10 wherein said peripheral device generates said reset signal when said peripheral device is powered up.

12. A method of detecting the identification of the type of card means that is installed in an input/output interface that electrically interconnects first and second electronic devices, the type of card means defining its predetermined functionality and configuration, the first device being capable of operating with one or more types of card means in response to the first device recognizing the identification as specifying a type of card means that the first device supports, said method comprising the steps of:

the first electronic device initially generating a first signal that is received by said card means;

the card means generating a digital identification that identifies the type of card means and therefore its predetermined functionality and configuration and applying said digital identification to the first electronic device in response to the first signal being applied thereto;

the first electronic device comparing said digital identification to a library of one or more digital identifications and configuring itself to operate in accordance with the predetermined functionality and configuration in response to a positive comparison to said applied digital identification; and, the first and second electronic devices selectively sending and receiving signals in accordance with the type of card means identified.

13. A method as defined in claim 12 wherein said first electronic device generates said first signal when it is powered up.

14. A method as defined in claim 12 wherein the card means comprises a shift register of the type which has a plurality of parallel inputs, a reset input, a clock input and a serial output, shift register generating said digital identification signal in response to said first signal being received and clock signals being applied.

15. A method as defined in claim 14 wherein said digital identification comprises a multi-bit digital word that is serially clocked out of the output by successive clock signals being applied.

16. A card means for use with an input/output interface that electrically interconnects a peripheral device and a peripheral control device, said card means controlling the functionality and configuration of the peripheral device and the peripheral control device, provided that the peripheral device is capable of supporting said card means, said card means comprising:

means for generating a multiple bit digital identification signal that identifies the type of card means and therefore its predetermined functionality and configuration for application to the peripheral device in response to a first signal being applied thereto, said means for generating beginning the generation of said multiple bit digital identification signal serially on a single output line responsive to said first signal being applied on a single input line.

17. A card means as defined in claim 16 wherein said means for generating comprises a shift register of the type which has a plurality of parallel inputs, a reset input, a clock input and a serial output, shift register generating said digital identification signal in response to said first signal being received and clock signals being applied.

* * * * *